3,404,154
PROCESS FOR PREPARING PYRIDOXAL-
5'-ORTHOPHOSPHATE
Kentaro Okumura, Kobe-shi, Hyogo-ken, Toji Nishihara, Sakai-shi, Osaka-fu, and Tatuo Oda, Osaka-shi, Japan, assignors to Tanabe Seiyaku Co., Ltd., Osaka, Japan, a corporation of Japan
No Drawing. Filed Mar. 16, 1966, Ser. No. 534,654
Claims priority, application Japan, Apr. 3, 1965, 40/19,669
1 Claim. (Cl. 260—297)

ABSTRACT OF THE DISCLOSURE

A method of producing pyridoxal-5'-orthophosphate which involves the phosphorylating, N,N'-di-(2-methyl-3-hydroxy-5-hydroxymethyl - 4 - pyridylmethylidene)-hydrazine with polyphosphoric acid, hydrolizing the resultant polyphosphate with dilute inorganic acid to give N,N'-di-(2-methyl-3-hydroxy-5-phosphonoxymethyl - 4 - pyridylmethylidene)-hydrazine and treating said hydrazine intermediate with nitrous acid in acidic medium to recover desired product. Pyridoxal-5'-orthophosphate is a coenzyme in many enzymatic reactions of amino acids and it is accordingly considered to be useful as an active form of vitamin $B_6$.

Process for preparing pyridoxal-5'-orthophosphate

This invention relates to new process for preparing pyridoxal-5'-orthophosphate.

Pyridoxal-5'-orthophosphate has been known as the coenzyme in many enzymatic reactions of amino acids and it is accordingly considered to be useful as the active form of vitamin $B_6$.

An object of this invention is to provide a process for preparing pyridoxal-5'-orthophosphate which is more economical and commercially advantageous in comparison with the prior art.

According to an embodiment of this invention, pyridoxal-5'-orthophosphate can be prepared by phosphorylating pyridoxal azine, namely, N,N'-di-(2-methyl-3-hydroxy - 5 - hydroxymethyl-4-pyridylmethylidene)-hydrazine with polyphosphoric acid, hydrolysing the resultant polyphosphate with diluted inorganic acid to give pyridoxal - 5' - orthophosphate zinc, namely, N,N' - di - (2-methyl-3-hydroxy - 5 - phosphonoxymethyl - 4 - pyridylmethylidene)-hydrazine and treating said hydrazone with nitrous acid in an acidic condition.

The process may be illustrated by the following equations:

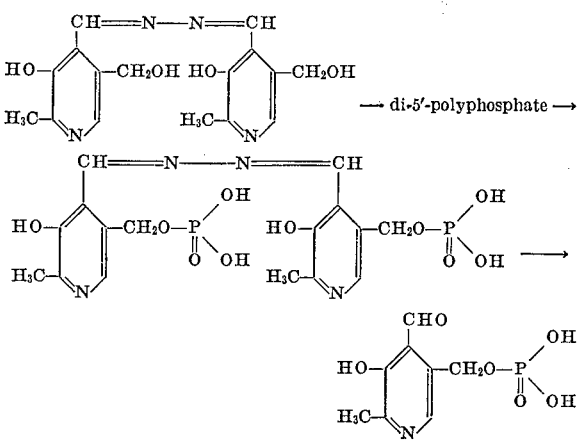

The hydrolysis and diazodegradation in the above process can be preferably carried out simultaneously by treating the polyphosphate with nitrous acid in an acidic condition. According to the present simplified process, pyridoxal-5'-orthophosphate may be produced in yield over 10% higher than those of the process illustrated in the above equations.

Pyridoxal azine is available, for example, according to the method described in J. Biol. Chem., vol. 236, page 2087 (1961). As the phosphorylating agent, a mixture of polyphosphoric acids prepared by heating orthophosphoric acid with phosphorus pentoxide is conveniently employed in this invention.

The phosphorylating reaction may be carried out preferably at a temperature between 30° and 60° C. for a time from 30 minutes to 6 hours. The resultant polyphosphate of pyridoxal azine is new compound, which may be isolated from the phosphorylated solution by adding sufficient amount of organic solvent such as ethanol to precipitate the polyphosphate. However, isolation of the polyphosphate is not essential for the use in subsequent hydrolysis.

The hydrolysis of the polyphosphate may be preferably carried out by heating it with diluted inorganic acid such as 0.1 N-hydrochloric acid on a water bath. Of course, the polyphosphate may be preferably hydrolysed in water by heating in the presence of the contaminated orthophosphoric acid. 5'-orthophosphate of pyridoxal azine thus produced in the reaction solution may be isolated from the solution by chromatographing on a suitable ion-exchanger. Sulfonic acid-type cation-exchange resin such as Amberlite IR-120 or Dowex 50W may be suitably employed for this purpose. The orthophosphate adsorbed on the ion-exchanger is eluted with water or diluted aqueous ammonia as the case may be. The orthophosphate may be crystallized out from the elute by concentration, adjusting pH to slightly acidic or by adding a solvent such as acetone which is insoluble thereof. The combination of the above procedures may be employed, if required.

The diazodegradation of the orthophosphate of pyridoxal azine may be carried out by treating it with nitrous acid in an acidic condition by a conventional method. For example, the reaction may be carried out by admixing the orthophosphate with a nitrous compound such as silver nitrite, sodium nitrite or isoamyl nitrite in an aqueous solution of a stronger inorganic acid such as hydrochloric acid and heating the mixture at a temperature between 50° to 80° C. for a short period of time.

Example 1

A mixture of 19.5 g. of 85% orthophosphoric acid and 15 g. of phosphorus pentoxide was heated on a water bath. To the resultant polyphosphoric acid was added 3 g. of pyridoxal azine a little at a time with stirring and the mixture was heated at 45° C. for 5 hours. The resultant pyridoxal-5'-polyphosphate azine of reddish orange viscous oil was dissolved in 100 ml. of water under ice-cooling and the solution was heated for 15 minutes with stirring on a water bath. The hydrolysed solution was cooled and introduced to a column of 350 ml. of Amberlite IR-120 (H-form).

After washing with water, the column was eluted with 1,500 ml. of 5% aqueous ammonia and the eluate was evaporated to remove solvent at a temperature lower than 50° C. under reduced pressure. The residue was dissolved in 50 ml. of water, 50 ml. of 10% hydrochloric acid was added to the solution and the solution was allowed to stand in an ice box for overnight. The resultant short needles were collected by filtration, washed with acetone and dried whereby 2.75 g. of pyridoxal-5'-orthophosphate azine·2-hydrochloride was obtained as greenish yellow crystals. Yield: 54%, M.P. 280° C.

*Analysis.*—Calculated for $C_{16}H_{22}O_{10}N_4P_2Cl_2$: N, 9.95; P, 11.00. Found: N, 9.83; P, 10.66.

Infrared absorption spectra:

$\nu_{max}$ (in Nujol): 3500–3200, 2060–2700, 1650, 1610, 1460, 1380, 1300, 1220 cm.$^{-1}$.

Ultraviolet absorption spectra:

$\lambda_{max.}^{H_2O}$ (pH 7.0): 290$\mu$ ($\epsilon$=12,300), 320$\mu$ ($\epsilon$=11,400)

2.0 g. of the crystal was suspended on 230 ml. of 0.1 N-hydrochloric acid. 1.5 g. of silver nitrite was added slowly to the suspension at a temperature lower than 10° C. with stirring, whereby color of the reaction mixture turned from orange yellow into very slightly greenish.

After cooling, the mixture was filtered and the filtrate was concentrated at a temperature lower than 50° C. in a stream of nitrogen gas under reduced pressure. The residue was dissolved in 100 ml. of water and the solution was introduced to a column of 100 ml. of Amberlite IRC-50 (H-form). The column was eluted with water and the eluate was concentrated at a temperature lower than 50° C. under reduced pressure. Acetone was added to the concentrate, whereby 1.42 g. of pyridoxal-5'-orthophosphate was obtained. Yield: 76%. The compound showed the same physiological properties with an authentic sample of pyridoxal-5'-orthophosphate.

Example 2

A mixture of 33 g. of 85% phosphoric acid and 33 g. of phosphorus pentoxide was heated to give polyphosphoric acid. 3.3 g. of pyridoxal azine was added to the polyphosphoric acid a little at a time with stirring and the mixture was heated at 40°–45° C. for 4 hours. The resultant viscous substance of reddish orange was dissolved in 30 ml. of water under ice-cooling. 200 ml. of 99% ethanol and 200 ml. of acetone were added to the solution. The resultant crystals were collected by filtration, washed with acetone and dried whereby 7.3 g. of pyridoxal-5'-polyphosphate azine was obtained as brownish yellow powder.

The powder was dissolved in 380 ml. of 0.1 N hydrochloric acid and 44 g. of silver nitrite was added to the solution a little at a time under cooling lower than 10° C. After stirring for additional 30 minutes at room temperature, the mixture was stirred at 60° C. for 30 minutes whereby brownish yellow color of the mixture faded into slightly greenish yellow. Then the mixture was evaporated to remove water at a temperature lower than 50° C. under reduced pressure and acetone was added to the residue. The resultant crystal was dissolved in water and the solution was adjusted to pH 5.6–5.8 with aqueous ammonia and introduced to a column of Amberlite IRC–50 (H-form). The column was eluted with water and the fractions having the similar ultraviolet absorption spectra were collected from the eluate. The eluate was concentrated at a temperature lower than 60° C. under reduced pressure whereby 2.55 g. of pyridoxal-5'-orthophosphate was obtained. The compound showed the same physiological properties with the product of Example 1.

We claim:

1. A process for preparing pyridoxal-5'-orthophosphate which comprises phosphorylating N,N'-di-(2-methyl-3-hydroxy-5-hydroxymethyl-4-pyridylmethylidene) - hydrazine with a mixture of polyphosphoric acids which is prepared by heating orthophosphoric acid with phosphorous pentoxide and subjecting the resultant polyphosphate to hydrolysis and diazodegradation with a nitrite in the presence of a strong mineral acid to give pyridoxal-5'-orthophosphate.

References Cited

FOREIGN PATENTS 711,442 6/1954 Great Britain.
880,595 10/1961 Great Britain.
1,067,872 6/1954 France.

OTHER REFERENCES

Ferrel et al.: J. Am. Chem. Soc., vol. 70, p. 2101, (1948).

HENRY R. JILES, *Primary Examiner.*

A. ROTMAN, *Assistant Examiner.*